Figure 2:
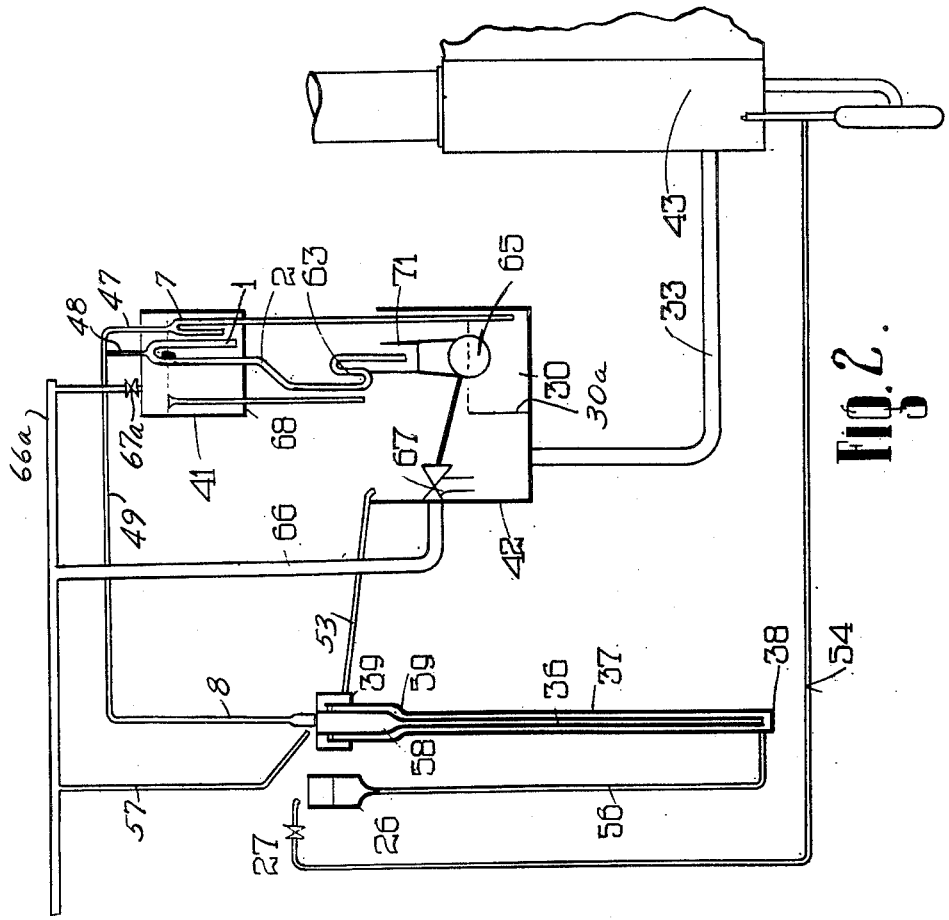

Oct. 14, 1952         C. COOPER         2,613,681
DELIVERY OF LIQUIDS
Filed May 1, 1944                             2 SHEETS—SHEET 1
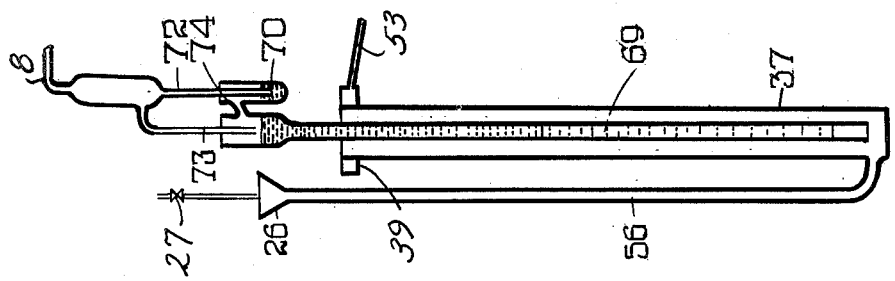
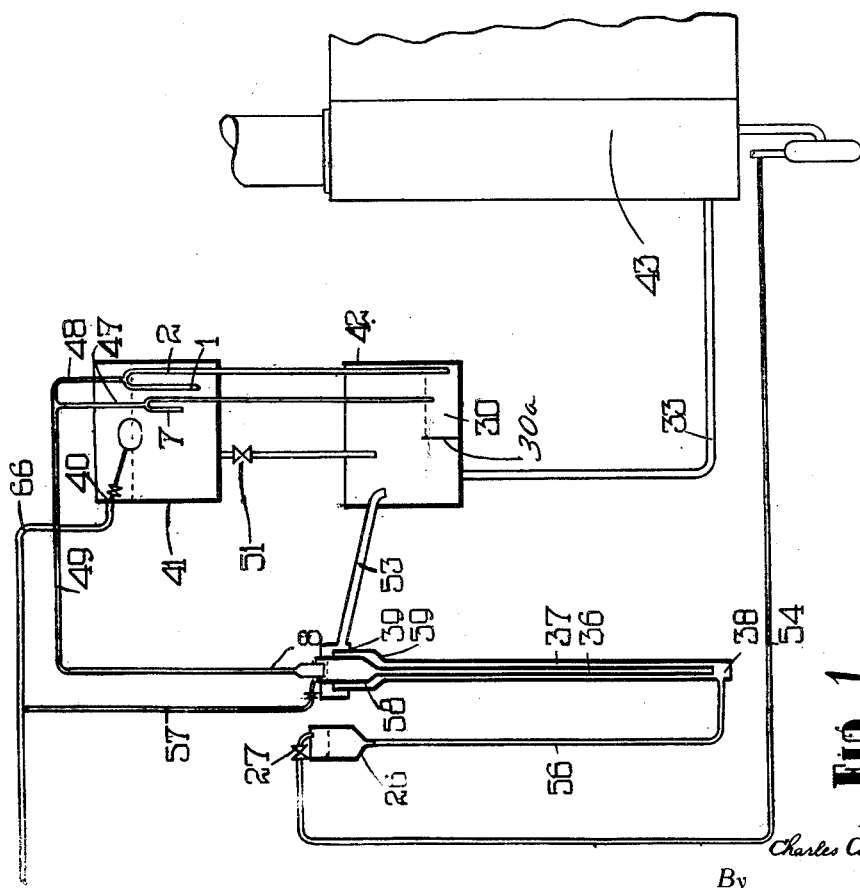
Inventor
Charles Cooper,
By
Mason, Porter & Dielu,
Attorneys.

Oct. 14, 1952    C. COOPER    2,613,681
DELIVERY OF LIQUIDS

Filed May 1, 1944    2 SHEETS—SHEET 2

Inventor
Charles Cooper,
By
Mann, Porter & Diller,
Attorneys

Patented Oct. 14, 1952

2,613,681

UNITED STATES PATENT OFFICE 2,613,681

DELIVERY OF LIQUIDS

Charles Cooper, Huddersfield, England, assignor to W. C. Holmes & Company Limited, Huddersfield, England, a British company Application May 1, 1944, Serial No. 533,596
In Great Britain February 16, 1943

2 Claims. (Cl. 137—4)

The present invention relates to method of and apparatus for delivering liquids for the purpose of regulating concentration.

It is the object of the invention to provide means for controlling concentration by keeping it at a certain fixed level.

According to the invention a method of regulating the concentration of a solution is provided which comprises producing a suction effect in a conduit, balancing a column of the solution and a column of diluting liquid whereby the liquid level in said column of diluting liquid varies with the density of the solution, employing said column of diluting liquid directly to seal the conduit when the liquid level thereof is high and for admitting leakage air to the conduit when the liquid level thereof is low, causing the existing suction effect in the conduit to lift diluting liquid and produce a syphon flow thereof when said column liquid level is high and to effect a lesser lifting of said latter diluting liquid and therewith a cessation of the syphon flow when the column liquid level is low, and mixing the syphon flow of said latter diluting liquid with the solution.

According to a further feature of the invention an apparatus for regulating the concentration of a solution is provided comprising a tank for a diluting liquid, a syphon effective to deliver diluting liquid from the tank into the solution and thereby cause change in the concentration of the solution, a conduit connected to a high level of said syphon, means for continuously producing a suction in said conduit, a vessel for an indicator liquid whose level in said vessel varies in accordance with the concentration of the solution, and a part of said conduit having an opening directly sealed by the indicator liquid in said vessel when the level thereof is high and opened when said liquid level falls, whereby the entrance of leakage air through said opening into the conduit controls the effective suction therein and therewith the lifting of diluting liquid in said syphon and the flow therethrough into said solution, in which two columns are provided, and pipes for supplying diluting liquid to one column and the solution to the other column, whereby the liquid level in said one column varies with the density of the solution, the liquid in said one column constituting said indicator liquid.

By means of the invention it is possible to control, for example, the concentration of ammonia in an ammonia scrubber and, therefore, the concentration of ammonia in the gases leaving the same.

In the process of washing ammonia from coal gas, wherein it is associated with the acid gases $CO_2$ and $H_2S$, it is usual to allow a controlled amount of ammonia to pass away with the washed gas, as the presence of small quantities of ammonia in the gas in the subsequent oxide purification process is beneficial, and serves to keep the oxide from acquiring an acid condition, which readily arises in the absence of ammonia. The proportion of ammonia allowed to pass out is normally about 5 grains per 100 cubic feet of gas, which may alternatively be expressed as about 0.015% by volume. To avoid the difficulty of measuring or knowing what the actual ammonia content is at this point, it is convenient to achieve this roughly constant proportion by adjusting the proportion of ammonia compounds in the first bay liquor of the washer, considering this as the gas outlet bay. If the liquid in circulation in this bay is maintained at 0.15% or thereabouts, measured as $NH_3$ in water, the gas passing out will have an ammonia content of the order previously stated. The actual figures depend on a number of variables such as the temperature of operation, the proportion of $CO_2$ in the gas being treated, and the efficiency of the washer bay, but the operator is presumed to have knowledge of the effects of these variables, and to be able to prescribe a liquor concentration in the bays which would achieve the result desired in the gas. It is possible to tabulate the three main variables involved so as to fix the liquid concentration required at any given time.

The density is controlled by balancing a column of the liquid the density of which is being regulated against a column of comparison liquid, and utilising the variations of level of the liquid to seal and unseal the air leak of a syphon system supplying water to the system of which the concentration is being regulated.

One liquid column, preferably the aqueous solution of variable composition, is preferably kept at a constant height, and the height of the other allowed to vary. It is possible to use water as the other liquid. It suffers however from the disadvantage that it is miscible with the solution, and that it does not provide a temperature compensation of the kind to be hereinafter described.

It is preferred to replace the column of water by a column partly of oil and partly of water, or by a column entirely of oil.

When the temperature in the first bay (gas outlet bay) of an ammonia washer rises, the vapour pressure of ammonia in the liquor will rise and accordingly if the ammonia content of the gas is to be kept constant the concentration of the ammonia liquor must fall, i. e. more water must be added. This weaker and therefore less dense, washing liquor means that the difference in level of the column of solution and water will be less. In order to compensate automatically for changes in temperature, I can with advantage use for the aforesaid column of another liquid, a column of liquid such that the difference in level of the two columns is approximately independent of temperature. It has been found in the case of an ammonia washer that the use of a column composed wholly of hydrocarbon oil for balancing against a column of liquor from the washer outlet bay results in over-compensation over a moderate temperature range, because hydrocarbon oils have a much larger coefficient of thermal expansion than the solution. Suitable compensation can be secured by superposing a suitable length of oil column on the water column, i. e. by replacing a part of the water by oil. Alternatively if the water is wholly replaced by oil, a suitable amount of compensation can be secured by using for the confinement of the oil column, a tube whose cross sectional area increases towards the upper end. This device can also be employed in conjunction with the partial oil column.

The length of the oil column to be superposed on the water column in the former case, and the rate of increase of cross sectional area with height in the latter case, can be calculated from a knowledge of the relative coefficient of thermal expansion and of the relationship between the water required and the temperature. It can be assumed that the coefficient of thermal expansion of the ammonia washing liquor (or of any other dilute aqueous solution) is the same as that of water.

In the application of the invention to an ammonia washer, a column of water and/or oil is balanced against a column of the liquid in the washing system. The liquid in the washing system is kept constantly flowing through the second column and this is kept at a constant level by an overflow, and variations in the level of the water surface may be used to regulate the supply of air to a suction syphon system arranged to deliver water to the washer.

The water and effluent should preferably be at the same temperature, although they may not be so at their point of supply. In general the water supply will be at a lower temperature than the liquor derived from the washer bay, although in practice the difference would not be so great as to interfere measurably with the effective difference in the specific gravities.

When the water surface is used to regulate the supply of air to a suction syphon, this may be done either directly by the water surface itself sealing and unsealing an air leakage pipe, or by a valve actuated by a small float on the surface of the water. The latter has the advantage of eliminating bubbling at the critical moment.

This application of the invention to the control of the concentration of ammonia in an ammonia scrubber is illustrated diagrammatically in Figs. 1, 2 and 3 of the accompanying drawings.

There are provided two concentric columns represented by a small pipe 36 threaded into a larger one 37, of a length of some six feet to ten feet standing vertically, the inner one being fed with clean water and the outer one with the ammonia liquor whose density is in question. If these two columns are joined together at the foot 38, it will be found that the water in the inner tube stands at a proportionately higher level than the liquid in the outer tube. The latter is, by this arrangement, actually a mixture of liquor and water, but by using a considerable predominance of the former, the admixture with water can be made of little importance. These supplies are run constantly at as slow rates as may be practicable, and the surplus as it runs away from the balancing device may be discharged into an overflow funnel 39 which returns it to the washer by way of pipes 53 and 33 along with the feed water.

The flow of liquid for the purpose of sampling is only of the order of 1 to 2 gallons per hour, thus if the pipes 36 and 37 are of any appreciable diameter such as would give reasonable strength and rigidity, no question of frictional resistance to flow arises. The difference in level at the upper ends of these tubes is, therefore, dependent only on the difference in specific gravity between water and liquor. The device works correctly with widely varying rates of feed, although only small rates are necessary.

The supply of ammonia liquor from the washer bay takes place through pipe 54. The liquor may be fed slowly through valve 27 into funnel 26 from which it flows by way of pipe 56 to the foot 38 of the column.

Fresh water is supplied to the column by way of pipe 57. The pipe 36 terminates in a funnel 58 and the pipe 37 in a funnel 59, both of which are inside the overflow funnel 39. The pipe 57 discharges into the funnel 58.

In order to make this small difference in level operate the water admission arrangement, the main supply of water is carried by pipe 66 to a float controlled valve 40 in an overhead feed tank 41 at such a height as to feed the water into a box 42 which thereafter communicates by a pipe 33 with the end bay 43 of the washer. In this overhead tank 41 there are two syphons, 1, and 1, 2; the first of these 1 is always submerged when the water in the tank is at its maximum level, and therefore will continuously syphon out at a comparatively small rate. At the vertex of this syphon, however, there is a tube 47 which communicates on the one side by means of pipe 48 with the vertex of the large syphon 1, 2, which is required to deliver the bulk of the water and is, in fact, the operating device for delivery of the water feed. On the other side it communicates by means of pipe 49 with an open mouthed tube 8 placed very close to the surface of the water in the inner balancing tube. As this small syphon 7 continues to deliver water, it draws air from the communicating pipes 48, 49, and if the open-ended tube 8 is actually submerged under the water surface, a definite suction can be created in this tube system. When this suction rises to a certain value, it draws water over into the main syphon 1, 2 and at a certain stage this begins to operate and will quickly empty the contents of the tank 41. When the latter is empty, there will be, for a short time, atmospheric pressure only in this tubular system, but when the inlet end of the small syphon 7 is again submerged, this will cease to be the case, and later when this syphon is completely submerged, the suction of air will begin again. If the effect of the delivery of a quantity of water into the washer bay is to reduce the concentration below the desired limit, there will be a continuous in leakage of air via the tube near the surface of the water in the balancing vessel, and no further syphoning on the part of the large syphon will occur until the density has risen to a point which will permit a suction to be developed again. If, on the other hand, the water feed has still not been sufficient, the syphon will continue to operate until such a condition has been arrived at.

In order to supplement the capacity of the device, a hand-control water feed 51 may be added, so that the large syphon need not be necessarily of such a capacity as will entirely effect the washing of the gas.

It is necessary to seal the outlet ends of the two syphons in order that these results can be achieved, which may be done by a small tank 30 provided by the wall 30a inside the larger tank 42.

In order to deal with large rates of water admission, the alternative arrangement of the syphons shown in Fig. 2 may be used.

In this, the discharge from the syphon 1, 2 is led into a small vessel 71 riding on the ball 65 of the ball valve 67, which controls the supply of water from supply pipe 66 to the tank 42, and thus to the washer 43. The ball 65 floats in a tank 30 which is inside the larger tank 42. Into tank 42 are discharged the flow from syphon 7 and also the liquid overflowing by the pipe 68 from a tank 41. The syphon 1, 2 has a seal 63 on its leg 2. The quantity of water discharged by syphon 1, 2 when tube 8 is sealed serves to load the float 65 of the control valve 67 and to open the said valve during the discharge. The valve 67 remains closed after each operation unless a new discharge takes place from the operating syphon.

In this case, it is not necessary to have a float control valve on the upper (small) tank 41 and it can be kept full by means of a constant discharge thereinto by pipe 66a and valve 67a, the tank being allowed to overflow through pipe 68, in the event of the syphons not being operated in a given period of time.

The overflow passes into the lower tank 30 having the float 65. The amount of water which thus overflows is much less than the amount to be delivered to the washer 43 and it can therefore be disregarded.

The feeds in the balancing device may be provided with filters just before the regulating cocks to ensure continuity of operation at low rate.

The central tube in the balance arrangement can be charged with oil instead of with water. The elevation will, of course, be greater. Fig. 3 illustrates this modification.

The central tube 69 charged with oil is provided inside the tube 37. According to the arrangement of Fig. 3, the drain tube 72 can draw from a separate reservoir 70 and does not deplete the liquid in the main vessel, the latter only supplying liquid for the air leakage tube 73, so that the tendency is reduced to produce immediately a fresh leakage before the supply can be made up by gravity through the main portion of the apparatus, that is through tubes 56, 37 and 69. The shots of air and oil can pass continuously up tube 73 and the oil will continuously be returned via tube 74. This device is particularly applicable when the suction is heavy. In Fig. 3, temperature changes may be allowed for by arranging the height of the column so that the change in density of the solution due to temperature just balances the change in level due to expansion.

I declare that what I claim is:

1. A method of regulating the concentration of a solution, which comprises producing a suction effect in a conduit, balancing a column of the solution and a column of diluting liquid whereby the liquid level in said column of diluting liquid varies with the density of the solution, employing said column of diluting liquid directly to seal the conduit when the liquid level thereof is high and for admitting leakage air to the conduit when the liquid level thereof is low, causing the existing suction effect in the conduit to lift diluting liquid and produce a syphon flow thereof when said column liquid level is high and to effect a lesser lifting of said latter diluting liquid and therewith a cessation of the syphon flow when the column liquid level is low, and mixing the syphon flow of said latter diluting liquid with the solution.

2. Apparatus for regulating the concentration of a solution, comprising a tank for a diluting liquid, a syphon effective to deliver diluting liquid from the tank into the solution and thereby cause change in the concentration of the solution, a conduit connected to a high level of said syphon, means for continuously producing a suction in said conduit, a vessel for an indicator liquid whose level in said vessel varies in accordance with the concentration of the solution, and a part of said conduit having an opening directly sealed by the indicator liquid in said vessel when the level thereof is high and opened when said liquid level falls, whereby the entrance of leakage air through said opening into the conduit controls the effective suction therein and therewith the lifting of diluting liquid in said syphon and the flow therethrough into said solution, in which two columns are provided, and pipes for supplying diluting liquid to one column and the solution to the other column, whereby the liquid level in said one column varies with the density of the solution, the liquid in said one column constituting said indicator liquid.

CHARLES COOPER.

REFERENCES CITED

The following references are of record in the file of this patent:

UNITED STATES PATENTS

| Number | Name | Date |
|---|---|---|
| 1,168,044 | Albright et al. | Jan. 11, 1916 |
| 1,544,705 | Wallace | July 7, 1925 |
| 1,966,638 | Morgan | July 17, 1934 |
| 2,019,896 | Edlich | Nov. 5, 1935 |
| 2,068,363 | Wetmore | Jan. 19, 1937 |
| 2,131,743 | Longhridge | Oct. 4, 1938 |
| 2,147,977 | Kalle | Feb. 21, 1939 |
| 2,225,498 | Hollander | Dec. 17, 1940 |
| 2,249,719 | Brown | July 15, 1941 |
| 2,442,888 | Cram | June 8, 1948 |